United States Patent
Mercer et al.

(10) Patent No.: US 9,088,174 B2
(45) Date of Patent: Jul. 21, 2015

(54) ADJUSTING VOLTAGE REGULATOR OPERATING PARAMETERS

(75) Inventors: Steven M. Mercer, Livermore, CA (US); Ronil D. Patel, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 623 days.

(21) Appl. No.: 13/524,087

(22) Filed: Jun. 15, 2012

(65) Prior Publication Data

US 2013/0335058 A1    Dec. 19, 2013

(51) Int. Cl.
| | |
|---|---|
| *H02M 3/156* | (2006.01) |
| *H02J 1/06* | (2006.01) |
| *H02M 3/157* | (2006.01) |
| *H02M 3/158* | (2006.01) |
| *H02M 1/00* | (2007.01) |

(52) U.S. Cl.
CPC  *H02J 1/06* (2013.01); *H02M 3/158* (2013.01); *H02M 2001/008* (2013.01); *H02M 2001/0048* (2013.01); *Y02B 70/1491* (2013.01)

(58) Field of Classification Search
CPC .......... H02M 2001/008; H02M 3/156; H02M 3/157; H02M 3/158; Y02B 70/16; Y02B 70/1466

USPC .................. 323/271, 282, 283, 284, 299, 351
See application file for complete search history.

(56) References Cited

U.S. PATENT DOCUMENTS

| | | | | |
|---|---|---|---|---|
| 7,782,029 | B2 * | 8/2010 | Chapuis et al. ............... | 323/267 |
| 8,125,200 | B2 * | 2/2012 | Tsai et al. ...................... | 323/267 |
| 8,456,147 | B2 * | 6/2013 | Cleveland et al. ............ | 323/283 |
| 8,946,932 | B2 * | 2/2015 | Boylan et al. .................. | 307/82 |
| 2012/0169308 | A1 * | 7/2012 | Dearborn et al. ............. | 323/271 |

OTHER PUBLICATIONS

Paul Greenland, Developments in Point of Load Regulation, pp. 1-5, Semtech Corporation, Camarillo, CA, USA.

* cited by examiner

*Primary Examiner* — Gary L. Laxton
(74) *Attorney, Agent, or Firm* — William B. Kempler; Frank D. Cimino (57) ABSTRACT

Within an electronic device, a voltage regulator powers a load. The voltage regulator has adjustable operating parameters that can be set during operation of the electronic device. The adjustable operating parameters are set or reset in accordance with a state of the electronic device, or a portion thereof having the load, in order to optimize power usage. The state is selectable from at least three predetermined states. Values for the operating parameters are selectable from a plurality of sets of values. Each set of values corresponds to at least one of the predetermined states.

20 Claims, 8 Drawing Sheets

PARAMETER LOOKUP TABLE 145

| STATE/ LOAD | ADAPTIVE PARAMETER | POWER BUS | POL(1) | POL(2) | POL(N) | |
|---|---|---|---|---|---|---|
| STATE 1 OR LOAD RANGE 1 (147) | Vbus | 6.0 V | -- | -- | -- | 152 |
| | Vgh | 5.0 V | 5.0 V | 5.0 V | 5.0 V | |
| | Vgl | 5.0 V | 5.0 V | 5.0 V | 5.0 V | |
| | Fsw | 300 KHz | 300 KHz | 400 KHz | 400 KHz | |
| STATE 2 OR LOAD RANGE 2 (148) | Vbus | 7.0 V | -- | -- | -- | 153 |
| | Vgh | 5.0 V | 5.0 V | 5.0 V | 10.0 V | |
| | Vgl | 5.0 V | 5.0 V | 5.0 V | 10.0 V | |
| | Fsw | 400 KHz | 400 KHz | 500 KHz | 500 KHz | |
| STATE 3 OR LOAD RANGE 3 (149) | Vbus | 11.0 V | -- | -- | -- | 154 |
| | Vgh | 5.0 V | 5.0 V | 10.0 V | 12.0 V | |
| | Vgl | 5.0 V | 5.0 V | 10.0 V | 12.0 V | |
| | Fsw | 500 KHz | 500 KHz | 500 KHz | 300 KHz | |
| STATE 4 OR LOAD RANGE 4 (150) | Vbus | 12.0 V | -- | -- | -- | 155 |
| | Vgh | 10.0 V | 10.0 V | 12.0 V | 12.0 V | |
| | Vgl | 10.0 V | 10.0 V | 12.0 V | 12.0 V | |
| | Fsw | 500 KHz | 500 KHz | 320 KHz | 400 KHz | |
| OTHER OR DEFAULT (151) | Vbus | 6.0 V | -- | -- | -- | 156 |
| | Vgh | 5.0 V | 5.0 V | 5.0 V | 5.0 V | |
| | Vgl | 5.0 V | 5.0 V | 5.0 V | 5.0 V | |
| | Fsw | 400 KHz | 400 KHz | 400 KHz | 300 KHz | |

ADJUSTING VOLTAGE REGULATOR OPERATING PARAMETERS

BACKGROUND OF THE INVENTION

Many electronic devices incorporate one or more voltage regulators to convert a system power source voltage level into one or more regulated voltages that are used to bias circuitry within the electronic device. There are a variety of different topologies of voltage regulators, each having unique strengths and weaknesses that are typically taken into account when designing or selecting a voltage regulator for a given application within an electronic device. For example, the level of the load may vary greatly during operation of the electronic device as various functions of the electronic device are activated or deactivated at different times. In such a case, the voltage regulator must be designed to respond to the anticipated changes in load while maintaining its output voltage within the specified limits.

The design of a voltage regulator generally includes the selection of various parameters that depend on the type of the voltage regulator and the anticipated load environment. For example, voltage regulators that are classified as switching regulators use combinations of switches (often embodied as transistors including MOSFETs, BJTs, IGBTs, JFETs, etc), inductors and/or transformers, and capacitors as the basis for step-up and/or step-down voltage conversion. Some voltage regulator design parameters will include the size of the transistors used as switches, the size/inductance of the inductors (or size/turns ratio of the transformers), the size/capacitance of the capacitors, the frequency at which the switches are turned on and off, and the voltage levels selected to turn on/off the switches, among other parameters. Additional parameters including the voltage regulator's input voltage range, output voltage range, and load range will help determine the voltage regulator design parameters.

The efficiency of the voltage regulator generally depends greatly on each voltage regulator design parameter in combination with the input voltage range, output voltage range, and load range, among other factors. However, since the load may vary during operation of the electronic device, it is impossible during the design phase to select 'fixed' values for these voltage regulator design parameters that will always result in the highest possible operating efficiency of the voltage regulator. As a result, since these regulator parameters are static, the voltage regulator is almost certain to operate below its highest possible operating efficiency for a significant percentage of the time. This situation occurs even if the most common operating power level of the electronic device is known and the parameters of the voltage regulator are selected accordingly.

In many typical situations, voltage regulators are designed to exhibit their highest efficiency at their highest operating power state. Consequently, they are generally over-designed for the lower power states. In other words, efficiency is significantly lower at the lower power states in these designs. This relationship between efficiency and power state is generally considered acceptable, since it is usually assumed that power loss should be minimized whenever the maximum rated power for the design is approached. However, there is a long-felt need to continue to increase overall power consumption efficiency for almost all electronic devices across the full load range, not just at the maximum rated power specification. However, efficiency improvements have generally been pushed so far as to have reached a level that any additional improvements at the highest power states can only result in relatively minor overall improvements.

Some voltage regulators are considerably less efficient under relatively light load conditions when compared to the efficiency at a 'normal' load or even a heavy load. Consequently, many such voltage regulators are designed to change their operating characteristics when a light load state, such as a sleep mode, occurs within the electronic device. Nevertheless, whether the electronic device is in a light load state or a heavy/normal load state, the load may still vary considerably, resulting in inefficient operation of the voltage regulator for a significant percentage of the time.

It is with respect to these and other background considerations that the present invention has evolved.

SUMMARY OF THE INVENTION

Some embodiments of the present invention generally involve operating a voltage regulator to power a load within at least a portion of an electronic device. The voltage regulator has a plurality of adjustable operating parameters that can be set and reset repeatedly during operation. The state of at least a portion of the electronic device is determined, e.g. by a controller connected to or part of the voltage regulator. The determined state is generally selected from one of at least three predefined states, i.e. more than a simple heavy load or light load state. Depending on the determined state, the adjustable operating parameters are set to predetermined values to optimize system power usage in at least the portion of the electronic device during operation of the voltage regulator. The predetermined values are generally selectable from a plurality of sets of values, each of which corresponds to at least one of the predefined states.

In more specific embodiments, a plurality of voltage regulators is operated to power a plurality of loads. Each of the voltage regulators has the plurality of adjustable operating parameters, which are set during operation to optimize system power usage depending on the determined state. Additionally, in some embodiments, the adjustable operating parameters generally include a switching frequency and two gate drive voltages. In some embodiments involving a plurality of the voltage regulators, the adjustable operating parameters for at least one of the voltage regulators may also include an output voltage level. Furthermore, in some embodiments involving a plurality of the voltage regulators, the operating parameters of each voltage regulator may be set independently of the other voltage regulators.

A more complete appreciation of the present disclosure and its scope, and the manner in which it achieves the above noted improvements, can be obtained by reference to the following detailed description of presently preferred embodiments taken in connection with the accompanying drawings, which are briefly summarized below, and the appended claims.

BRIEF DESCRIPTION OF THE DRAWINGS

as shown in FIG. 1) compared to an example prior art graph.

as shown in FIG. 1) compared to example prior art graphs.

DETAILED DESCRIPTION OF THE INVENTION

Figure 1:
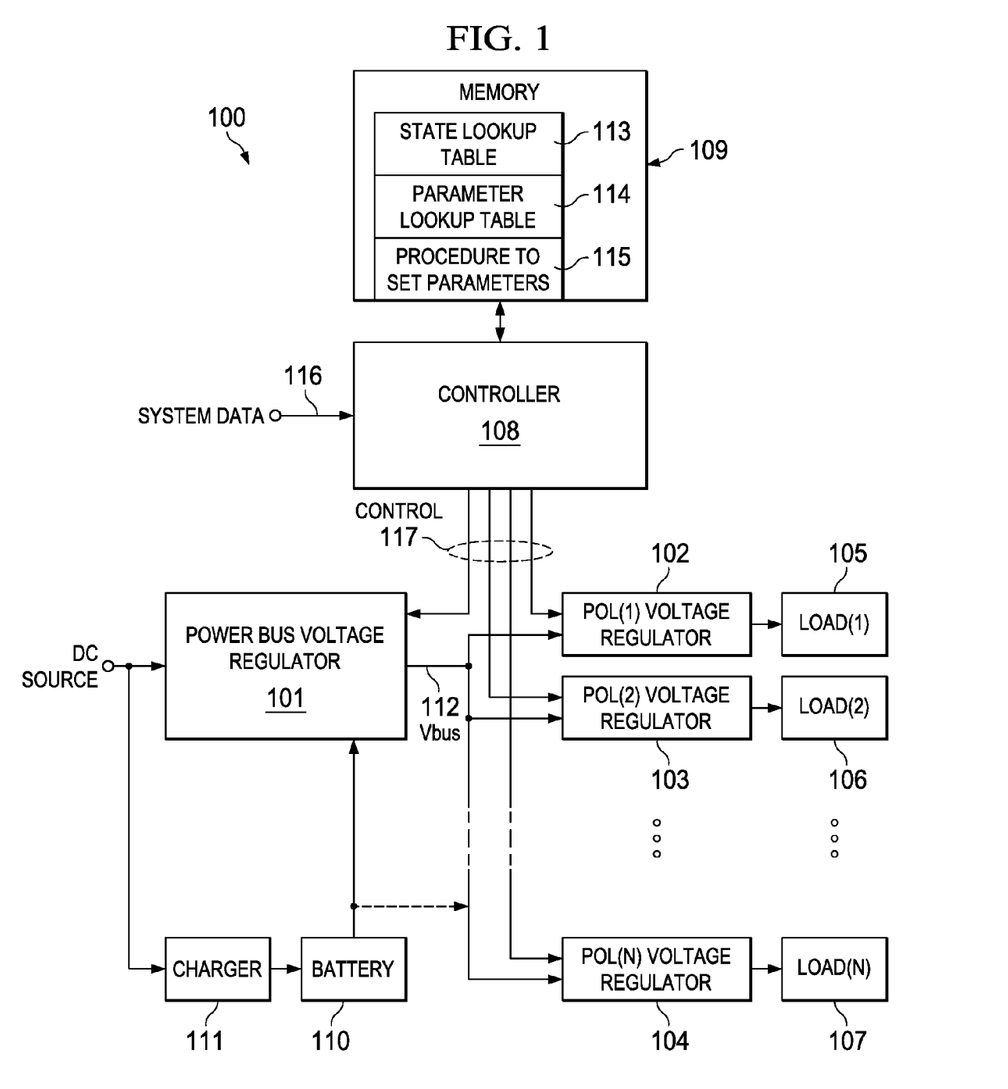
FIG. 1 is a simplified schematic diagram of at least a portion of an electronic device with a dynamically optimizable system power architecture incorporating an embodiment of the present invention.

An example of an electronic device or system 100 (or at least a portion thereof) incorporating an embodiment of the present invention is shown in FIG. 1. The electronic device 100 may be a computer (e.g. server, desktop, notebook, tablet, etc.), a telephone (e.g. cellular, smart phone, land line, etc.), a game console (e.g. handheld, set top box, etc.), a network device (e.g. modem, router, repeater, switch, hub, etc.), an audio or video player, a television or other appropriate type of electronic system. The specific schematic of the electronic device 100 is shown for illustrative purposes only and is not necessarily intended to limit the scope of the present invention, unless specifically called for in the claims. Therefore, combinations of components other than that shown are generally within the scope of the present invention. For example, some components shown as a single block in FIG. 1 may be multiple physical components in some embodiments of the present invention, while some components shown as multiple separate blocks in FIG. 1 may be combined as desired or appropriate and still remain within the scope of the present invention. Still other components not shown in FIG. 1 or described herein may be included in some embodiments, while some components specifically shown in FIG. 1 and/or described herein may be optional or not included in some embodiments.

The example electronic device 100 generally includes multiple voltage regulators 101, 102, 103, 104, a variety of loads 105, 106, 107, a controller 108 and a memory 109, among other possible components. The example electronic device 100 may also include a battery 110 and charger 111 for embodiments that are battery operated.

The loads 105-107 generally represent circuit components that are appropriate for the type of the electronic device 100. For example, if the electronic device 100 is a notebook computer, then the loads 105-107 may represent one or more core processors, a graphics processor and/or a memory subsystem, among other appropriate system components. In another example, if the electronic device 100 is a cell phone, then the loads 105-107 may represent a main processor, a wireless transceiver and/or a display, among other appropriate components. Many other variations and examples for the loads 105-107 are also within the scope of the present invention.

Although, the present invention is generally described herein with reference to an electronic device having multiple voltage regulators 101-104, it is understood that the present invention is not necessarily so limited. Rather, some embodiments may use only a single voltage regulator. Depending on the embodiment, any number of voltage regulators may be used.

The voltage regulators 102-104 generally represent any appropriate type of point-of-load (POL) voltage regulators for providing power at a regulated voltage level to the loads 105-107. The POL voltage regulators 102-104 may thus be any appropriate switching power supplies, buck switching regulators, boost-type switching regulators, synchronous buck regulators, DC/DC converters, etc. The specific type or topology of each POL voltage regulator 102-104 generally depends on the needs of loads 105-107 and the requirements of the overall electronic device 100.

The voltage regulator 101 generally represents any appropriate type of voltage regulator for providing power to the POL voltage regulators 102-104. The voltage regulator 101 generally produces this power at a desired voltage on a power bus or rail (Vbus) 112. The power is then supplied as an input to the POL voltage regulators 102-104. The voltage regulator 101 may thus be commonly referred to as a power bus voltage regulator. The power bus voltage regulator 101 receives power from a DC source, which may be an AC/DC converter, a DC/DC converter, another voltage regulator or other appropriate source. In some embodiments, there may be an upstream stacked hierarchy of voltage regulators that feed power into the power bus voltage regulator 101 and down to the POL voltage regulators 102-104 (and optionally to the charger 111).

The voltage regulators 101-104 have a variety of design parameters that depend on the type of each of the voltage regulators 101-104. In some embodiments, these design parameters may include the size of a pair of switching transistors, the size/inductance of an output inductor, the size/capacitance of an output capacitor, the frequency at which the transistors are turned on and off, the level of the voltage applied to the gates of the transistors in order to turn the transistors on/off, the level of the input voltage and the level of the output voltage, among other parameters. Some of these parameters (e.g. operating parameters, such as the frequency at which the transistors are turned on and off, the level of the voltage used to drive the gates of the transistors in order to turn the transistors on, the level of the input voltage and the level of the output voltage) can potentially be easily adjusted during operation of the electronic device 100. (For example, when the voltage regulator 101-104 encounters a lighter load, a lower gate drive voltage may be supplied to the switching transistors, provided the switching transistors can be properly turned on/off and a slew rate adequately maintained.) Other of these parameters (e.g. the size of switching transistors, the size/inductance of the output inductor and the size/capacitance of the output capacitor) are not easily amenable to being adjusted during operation of the electronic device 100. However, since adjustable or variable versions of some of these components are known, it is possible to include such parameters as part of the adjustable parameters within the scope of the present invention.

As a result of each of the various embodiments described herein, the electronic device 100 generally dynamically optimizes the performance of the voltage regulators 101-104 and, thus, dynamically optimizes system efficiencies. This optimization is generally achieved by adjusting the values of the operating parameters that can potentially be adjusted during operation of the voltage regulators 101-104 with as high a level of resolution as is practical for any given application or situation. Therefore, instead of simply having a "light load" exception to normal operation, the voltage regulators 101-104 can be operated with as many tiers or levels of operating conditions as desired or as necessary to optimize power consumption at the POL level. Examples of some of the values to which some of the operating parameters may be set and examples of some of the beneficial effects thereof are generally shown and described below with respect to FIGS. 3-10.

The controller 108 generally centralizes the handling of basic operations of the electronic device 100, such as coordinating functions of subcomponents thereof, e.g. the functions of the voltage regulators 101-104. Therefore, the controller 108 may represent one or more appropriate general purpose programmable embedded microprocessors that execute instructions stored in the memory 109, which may be any appropriate RAM and/or ROM storage component. The memory 109, in addition to other possible programs and data, generally stores a state lookup table 113, a parameter lookup table 114 and a procedure 115 for monitoring the state of the electronic system 100 (or at least a portion thereof) in order to repeatedly select and set/reset the parameters for the voltage regulators 101-104. Alternatively, the controller 108 may be one or more ASICs (application specific integrated circuits) with the functions (e.g. the procedure 115, etc.) and the data (e.g. the tables 113 and 114, etc.) for controlling other subcomponents hardwired into its circuitry.

The controller 108 receives various types of system data (e.g. on system data lines 116) from some components of the electronic device 100. The system data thus generally represents a variety of data, at least some of which may be the same or similar to data acquired by prior art processes for controlling prior art electronic devices. In some embodiments of the present invention, the system data includes at least feedback indicative of the present electrical current or power consumption of the loads 105-107, i.e. current load data, so the controller 108 can react to present load conditions.

Additionally, in some embodiments, the system data may further include predictive or proactive (instead of reactive) data regarding imminent operating conditions of the electronic device 100 or at least a portion thereof, e.g. of the loads 105-107. Some prior art controllers that are responsible for system management of electronic devices already receive some types of power information. In some cases, such information is related to operating conditions that the loads (e.g. the loads 105-107) have yet to execute on, meaning that in some instances, the controller 108 may have knowledge that a load transient is going to happen within at least a part of the electronic device 100 before it actually occurs.

In some embodiments, various control lines 117 connect the controller 108 to one or more of the voltage regulators 101-104. The controller 108 generally produces control data or signals on the control lines 117 for each of the voltage regulators 101-104 as described below.

With the current load data and/or the predictive data, the controller 108, under control of the procedure 115 and using the state lookup table 113, determines a present and/or imminent state of the electronic device 100 (or at least a portion thereof) and/or of the loads 105-107. The controller 108 generally makes this determination by looking up the state information in the state lookup table 113 based on the current load data and/or the predictive data (or a range of values within which this data falls). For embodiments using only the current load data, the controller 108 can generally determine only the present state data. However, for embodiments using the predictive data instead of or in addition to the current load data, the controller 108 can determine the imminent state data, i.e. the state that the electronic device 100 (or at least a portion thereof) and/or of the loads 105-107 is about to enter.

Then with the state information, the controller 108, under control of the procedure 115 and using the parameter lookup table 114, determines the optimal levels for each of the adjustable parameters for the voltage regulators 101-104. The controller 108 generally makes this determination by looking up the values for the adjustable parameters (the parameter data) in the parameter lookup table 113 based on the determined state.

Alternatively, in some embodiments the tables 113 and 114 are combined in a single state/parameter combined table. Therefore, these lookup tasks may be done together. In this case, the controller 108 generally looks up (in the combined table) the present and/or imminent state and the optimal levels for each of the adjustable parameters based on the current load data and/or the predictive data (or a range of values within which this data falls).

In another alternative, the state data is not obtained, and the state lookup table 113 is not part of the electronic device 100. Instead, the current load data and/or the predictive data is used to represent, or used in place of, the state of the electronic device 100 (or at least a portion thereof) and/or of the loads 105-107. In this case, the controller 108 generally looks up (in the parameter lookup table 114) the optimal levels for each of the adjustable parameters based on the current load data and/or the predictive data (or a range of values within which this data falls).

In yet another alternative, the controller 108 generally looks up (in the state lookup table 113) the present and/or imminent state based on the current load data and/or the predictive data (or a range of values within which this data falls), but does not look up the optimal levels for each of the adjustable parameters. Instead, the parameter lookup table 114 (or relevant portions thereof) is stored in, or is accessible to, each voltage regulator 101-104, so that each voltage regulator 101-104 can look up the optimal levels for its adjustable parameters based on the present and/or imminent state data determined by the controller 108.

In the previous embodiments, the controller 108 is used as a central hub at which the relevant data is aggregated in order to determine the present and/or imminent state of the electronic device 100 (or at least a portion thereof, e.g. the loads 105-106) and to coordinate setting the optimal levels for the adjustable parameters of the voltage regulators 101-104. However, in other alternatives, a determination of the state data is not performed at a system level (or at any level higher than the individual loads 105-107). Instead, each voltage regulator 101-104 receives its own local current load data and contains (or has access to) a relevant version (or subset) of the tables 113 and 114. Therefore, using its version of the state lookup table 113, each voltage regulator 101-104 determines its present state based on its current load data (or a range of values within which this data falls). Also, using its version of the parameter lookup table 114, each voltage regulator 101-104 looks up the optimal levels for its adjustable parameters based on its determined present state. Alternatively, each voltage regulator 101-104 looks up the optimal levels for its adjustable parameters based on its current load data (or a range of values within which this data falls), so a determination of its present state is optional or unnecessary. In another alternative, each voltage regulator 101-104 receives the predictive data regarding the imminent state of its load 105-107, so the voltage regulator 101-104 can determine the optimal levels for its adjustable parameters based on the imminent state in addition to or instead of the present state of its load 105-107.

Based on the present and/or imminent state data and/or the optimal levels for the adjustable parameters for the voltage regulators 101-104, the controller 108 generates the control data or signals on the control lines 117 for each of the voltage regulators 101-104 independently of each other. For embodiments in which the control data represents the optimal levels for the adjustable parameters, each voltage regulator 101-104 uses this data to independently select and set/reset its adjustable parameters as its loading conditions change and/or are anticipated to change during operation thereof. For embodiments in which the control data represents only the present and/or imminent state of the electronic device 100 (or at least a portion thereof, e.g. the loads 105-106), each voltage regulator 101-104 uses this data to internally determine the optimal levels for its adjustable parameters as described above. Each voltage regulator 101-104 then independently sets or resets its adjustable parameters accordingly as its loading conditions change or are anticipated to change during operation thereof. For embodiments in which a determination of the state data is not performed at a system level (or at any level higher than the individual loads 105-107), the control lines 117 may not be present and the control data may not be produced by the controller 108, since each voltage regulator 101-104 may determine and set/reset its adjustable parameters based on its current load data without input from the controller 108.

For embodiments using only the current load data or the present state data, the voltage regulators 101-104 can be made to respond only in a reactive manner after changes have occurred to any of the loads 105-107. However, for embodiments using the predictive data or the imminent state data, whether at a system level (e.g. by the controller 108) or at a point-of-load level (e.g. by individual POL voltage regulators 102-104), the voltage regulators 101-104 can be caused to prepare in advance to make changes to their adjustable parameters. Any lag time between a change in state and a change in adjustable parameters can thus be reduced or potentially eliminated.

For embodiments that include the battery 110 and charger 111, the output of the battery 110 may feed directly into the POL voltage regulators 102-104 (dashed line) or may first pass through an intervening voltage regulator (solid line) before feeding into the POL voltage regulators 102-104. Since the output voltage of the battery 110 may change as the battery 110 is charged or discharged, the use of the intervening voltage regulator enables better control over the input voltage level for the POL voltage regulators 102-104. (In some embodiments, the input voltage level for the POL voltage regulators 102-104 may be one of the parameters that is set or reset during operation of the electronic device 100, even in battery mode.) Since the power bus voltage regulator 101 already feeds into the POL voltage regulators 102-104, the power bus voltage regulator 101 may be used to regulate the voltage from the battery 110 (as shown), but alternatively a separate voltage regulator (having adjustable parameters as described herein) may be placed between the battery 110 and the POL voltage regulators 102-104. Furthermore, the charger 111 may be of the form of a voltage regulator that also has adjustable parameters as described herein.

Figure 2:
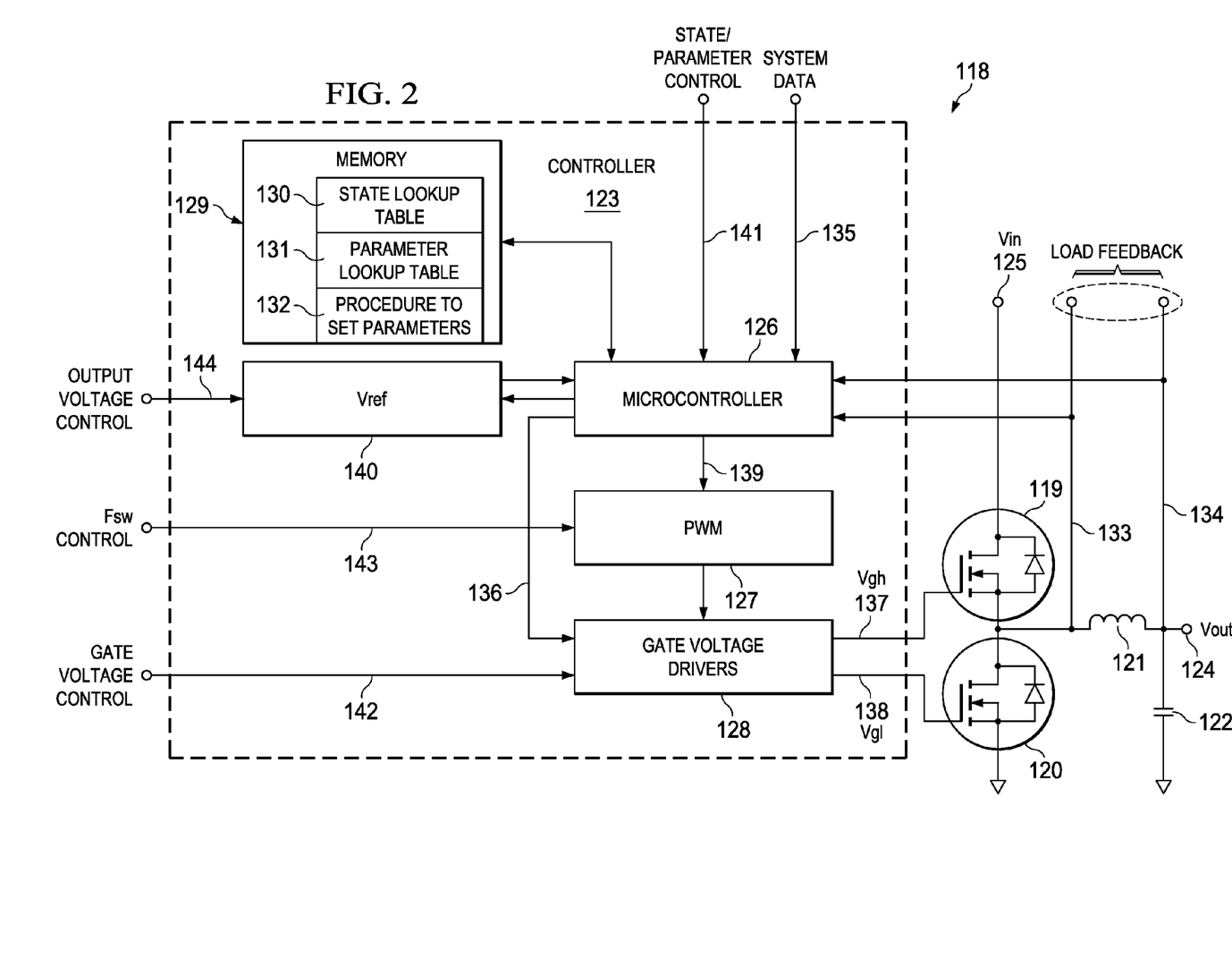
FIG. 2 is a simplified schematic diagram of a voltage regulator for use in an electronic device incorporating an embodiment of the present invention.

An example voltage regulator 118 incorporating an embodiment of the present invention is shown in FIG. 2. In an appropriate design, the voltage regulator 118 may be used as any of the voltage regulators 101-104 (FIG. 1). The specific schematic of the voltage regulator 118 is shown for illustrative purposes only and is not necessarily intended to limit the scope of the present invention, unless specifically called for in the claims. Therefore, combinations of components other than that shown are generally within the scope of the present invention. For example, some components shown as a single block in FIG. 2 may be multiple physical components in some embodiments of the present invention, while some components shown as multiple separate blocks in FIG. 2 may be combined as desired or appropriate and still remain within the scope of the present invention. Still other components not shown in FIG. 2 or described herein may be included in some embodiments, while some components specifically shown in FIG. 2 and/or described herein may be optional or not included in some embodiments.

The example voltage regulator 118 generally includes a high side transistor 119, a low side transistor 120, an output inductor 121, and output capacitor 122 and a controller 123. The controller 123 may be a PWM (pulse width modulation) controller or an ASIC or other appropriate circuitry. Under control of the controller 123, the components 119, 120, 121 and 122 produce a regulated output voltage Vout on line 124 from an input voltage Vin received on line 125. The output voltage Vout powers the load of the voltage regulator 118. In the case of the POL voltage regulators 102-104 (FIG. 1), the input voltage Vin is the regulated output voltage of the power bus voltage regulator 101 on the Vbus 112, and the regulated output voltage Vout is supplied to the loads 105-107. In the case of the power bus voltage regulator 101, the input voltage Vin comes from the upstream DC source, and the regulated output voltage Vout is supplied to the POL voltage regulators 102-104 on the Vbus 112.

The controller 123 generally includes a microcontroller 126, a PWM (pulse width modulator) 127, gate voltage drivers 128 and a memory 129. For embodiments in which the voltage regulator 118 controls some or all of the functions of determining the state of its load and/or setting its adjustable parameters (e.g. as described above), the memory 129 generally includes a state lookup table 130, a parameter lookup table 131 and a procedure 132 for monitoring the state of the load in order to set the adjustable parameters. The tables 130 and 131 and the procedure 132 are generally voltage-regulator-specific versions of the tables 113 and 114 and the procedure 115 of FIG. 1, so they are specifically tailored for the predetermined optimized requirements of the voltage regulator 118, unlike the tables 113 and 114 and the procedure 115, which are tailored for the broader-based requirements of all of the various voltage regulators 101-104. For embodiments in which the state data is determined at a system level (e.g. by the controller 108 using the state lookup table 113), however, the state lookup table 130 is not present in the controller 123. Additionally, for embodiments in which the optimal levels for the adjustable parameters are also determined at a system level (e.g. by the controller 108 using the parameter lookup table 114), the parameter lookup table 131 is not present in the controller 123 either.

The microcontroller 126 may be a general purpose microprocessor, an ASIC or other appropriate circuitry. The microcontroller 126 generally receives load feedback signals on lines 133 and 134, e.g. from before and after the output inductor 121. For embodiments in which neither the state data nor the parameter data is determined at a system level (e.g. by the controller 108), the load feedback signals may provide the only information with which the state data and parameter data may be determined. In this case, the voltage regulator 118 can be made to respond only in a reactive manner after changes have occurred to its load. Alternatively, the microcontroller 126 may receive the predictive data described above (or at least a reduced relevant portion thereof) from its load or from the controller 108, e.g. on system data lines 135. In this case, the voltage regulator 118 can be caused to prepare in advance to make changes to its adjustable parameters, thereby reducing or potentially eliminating any lag time between a change in state and a change in adjustable parameters.

For embodiments in which neither the state data nor the parameter data is determined at a system level (e.g. by the controller 108), under control of the procedure 132, the microcontroller 126 uses the load feedback signals to determine the current load data for its load. With the current load data, the microcontroller 126 looks up the current state of its load in the state lookup table 130. Alternatively, with the predictive data, the microcontroller 126 looks up the imminent state of its load in the state lookup table 130. With the current and/or imminent state data, the microcontroller 126 looks up the optimal levels for its adjustable parameters in the parameter lookup table 131. Alternatively, the microcontroller 126 uses the current load data and/or the predictive data to look up the optimal levels for its adjustable parameters in the parameter lookup table 131, without also making a separate determination of the state data. With the parameter data, the microcontroller 126 generally controls the gate voltage drivers 128 (e.g. via line 136) to set the voltage levels at which the gate voltage drivers 128 drive the transistors 119 and 120 through lines 137 and 138 (i.e. the gate drive voltages). Additionally, in accordance with the parameter data, the microcontroller 126 generally controls the PWM 127 (e.g. via line 139) to set the switching frequency at which the gate voltage drivers 128 alternate driving the transistors 119 and 120 to produce the output voltage Vout from the input voltage Vin. Furthermore, with the parameter data, the microcontroller 126 generally controls the level of the output voltage Vout, such as by setting a reference voltage Vref 140 to which the output voltage Vout is regulated (e.g. in the case of the power bus voltage regulator 101). This embodiment may be described as a self-contained reactive loop for the voltage regulator 118.

For embodiments in which the current and/or imminent state data (but not the parameter data) is determined at a system level (e.g. by the controller 108, as described above), the state data is transmitted to the controller 123, e.g. via state/parameter control line 141, which may come from the control lines 117 of FIG. 1. Under control of the procedure 132, the microcontroller 126 uses the state data to look up the optimal levels for its adjustable parameters in the parameter lookup table 131. With the parameter data, the microcontroller 126 generally sets the gate drive voltages, the switching frequency and the level of the output voltage Vout, as described above.

For embodiments in which the parameter data is determined at a system level (e.g. by the controller 108, as described above), the parameter data is transmitted to the controller 123, e.g. via the state/parameter control line 141. Under control of the procedure 132, the microcontroller 126 uses the parameter data to set the gate drive voltages, the switching frequency and the level of the output voltage Vout, as described above.

In some embodiments, not only is the parameter data determined at the system level, but either the voltage regulator 118 doesn't include a built-in capability to reset its adjustable parameters or it is desired to bypass the microcontroller 126 in setting the adjustable parameters. In this case, the controller 108 (FIG. 1) uses the parameter data to generate a gate voltage control signal (e.g. on line 142), a Fsw (switching frequency) control signal (e.g. on line 143) and an output voltage control signal (e.g. on line 144) for the voltage regulator 118. (These signal lines 142-144, for example, may form at least a portion of the control lines 117 of FIG. 1.) The gate voltage control signal sets the voltage level that the gate voltage drivers 128 generate to drive the transistors 119 and 120. The Fsw control signal sets the switching frequency that the PWM 127 provides to control the gate voltage drivers 128. The output voltage control signal sets the level of the reference voltage Vref 140, thereby setting the level to which the output voltage Vout is regulated (e.g. in the case of the power bus voltage regulator 101).

The electronic device 100 of FIG. 1 and the voltage regulator 118 of FIG. 2 illustrate that some features of the present invention may be implemented at a system level in the controller 108 or at a POL level in the controller 123 or both. Any given implementation may generally depend on the type of system in which the present invention is incorporated. For example, for electronic devices that have a central processor or microcontroller (e.g. the controller 108) of sufficient capability, it may be desirable to have as much of these functions as possible in the controller 108. In this case, the individual voltage regulators 101-104 may be as simple as possible. In another example, if an electronic device does not have such a central processor or if the functions described herein cannot be readily incorporated into its central processor (e.g. the requisite data is not available or not usable or the central processor does not have sufficient capability), then it may be desirable to have these functions built in to the individual voltage regulators. Other considerations may also affect relevant design decisions. In some embodiments, for example, if it is desired to control the output voltage level of the power bus voltage regulator 101 (i.e. the input voltage level of the POL voltage regulators 102-104), then the control features may have to reside at a system level (e.g. in the controller 108) in order to access the necessary level of information. Otherwise, the power bus voltage regulator 101 could be designed with a more powerful controller than those in the POL voltage regulators 102-104 in order to handle a greater level of complexity of optimization functionality.

Figure 3:
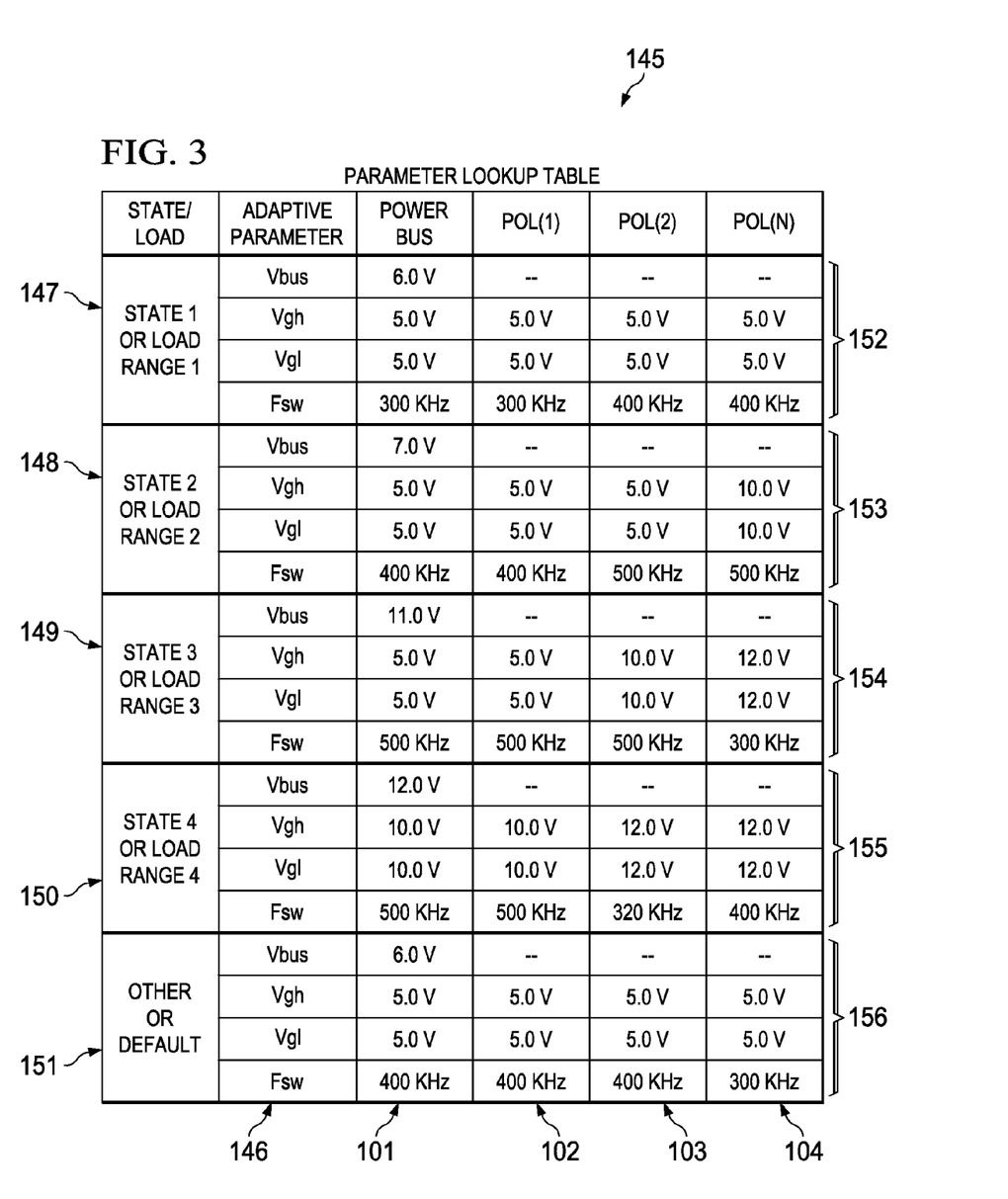
FIG. 3 is an example of a table for use within the system power architecture shown in FIG. 1 and/or the voltage regulator shown in FIG. 2 according to an embodiment of the present invention.

An example of a parameter lookup table 145 is shown in FIG. 3. An example of a state lookup table would generally map sets of the current and/or imminent state data values (or ranges thereof) to a set of numbered states. The numbered states then generally map or correspond to a plurality of sets of parameters 146 in the parameter lookup table 145 for each of the voltage regulators 101-104. In the example of FIG. 3, five example states 147-151 (or ranges for the level of the load 105-107) are shown with example parameter data 152-156 for the voltage regulators 101-104.

Since the parameter lookup table 145 shows the parameter data 152-156 for all of the voltage regulators 101-104, the parameter lookup table 145 is generally an example for the parameter lookup table 114 of FIG. 1. An example for the parameter lookup table 131 of FIG. 2, on the other hand, would likely have entries for the parameter data 152-156 only for the one voltage regulator 101-104 in which the data is used.

The example parameters 146 shown include a high side gate drive voltage level (Vgh), a low side gate drive voltage level (Vgl), a switching frequency (Fsw) and an output voltage level (Vbus) for the voltage regulators 101-104. (As mentioned above, other types of adjustable parameters may also be included.) The Vgh parameter value is for setting the voltage level output by the gate voltage drivers 128 on line 137 to drive the high side transistor 119 (FIG. 2). The Vgl parameter value is for setting the voltage level output by the gate voltage drivers 128 on line 138 to drive the low side transistor 120. The Fsw parameter value is for setting the frequency generated by the PWM 127 for causing the gate voltage drivers 128 to switch the transistors 119 and 120 on and off. The Vbus parameter is shown provided only for the power bus voltage regulator 101. Output voltage parameter values are not shown for the other voltage regulators 102-104, since the loads 105-107 generally operate on a single voltage level. However, in some embodiments, some of the loads 105-107 may operate on a variable input voltage level. In this case, the corresponding voltage regulator 102-104 may have an output voltage parameter value, similar to the Vbus parameter.

The numbers shown for the example parameter data 152-156 in the parameter lookup table 145 are for illustrative purposes only. Other values may be used and generally depend on the requirements and capabilities of any given design.

The number of states 147-151 shown in the parameter lookup table 145 is also for illustrative purposes only. Any number of predetermined states may be used as may be possible or practical in order to provide any desired granularity for the efficiency optimization. In general, but not necessarily, voltage regulators that provide greater amounts of power or have a larger dynamic load range may have more states, while voltage regulators that provide lesser amounts of power or have a smaller dynamic load range may have fewer states.

Although the parameter lookup table 145 shows the same number of states for each voltage regulator 101-104, it is understood that the present invention is not necessarily so limited. Instead, it is not necessary to have the same number of states for every voltage regulator 101-104. Therefore, each voltage regulator 101-104 generally has whatever number of states (with corresponding optimal adjustable parameters) is desired, appropriate or practical for any given design. Additionally, in some embodiments, some of the voltage regulators 101-104 could be provided with fewer states by having identical parameter data in two or more states, thereby in effect combining two or more states into one.

The values that are placed in the parameter lookup table 114, 131 or 145 are generally empirically produced in a circuit simulation or in a laboratory or manufacturing setting. To do so, each of the design parameters may be tested iteratively with all of the other design parameters of the voltage regulator 101-104 to determine an optimum configuration of parameter values for an anticipated range of load level or anticipated likely operating load values. The design parameters thus tested may include both the adjustable and nonadjustable parameters mentioned herein. As a result of the iterative testing, a set of discrete optimal values for each parameter as a function of load is generated, as well as a single value for each of the nonadjustable parameters included in the testing.

Figure 4:
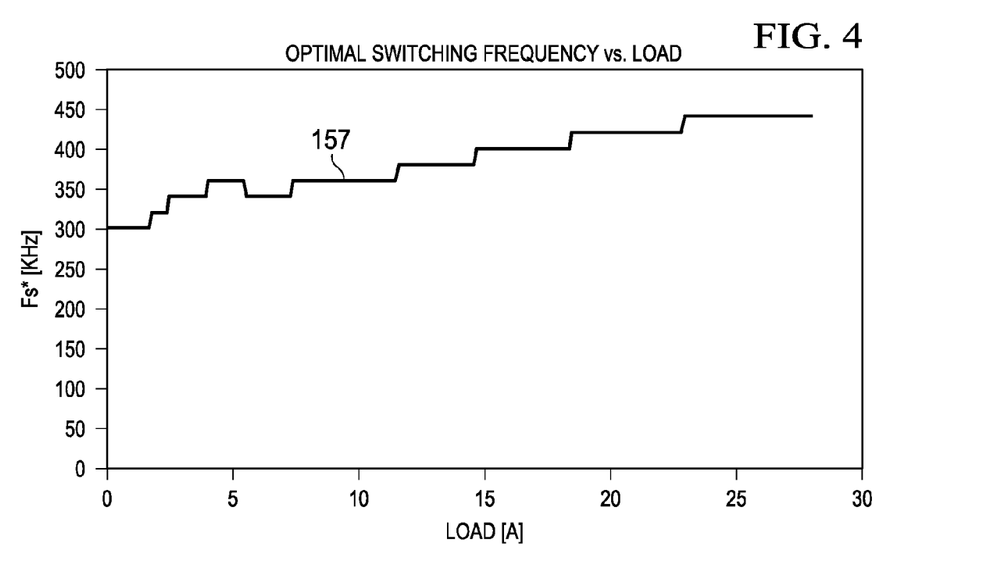
FIG. 4 is an example of a graph of an adjustable operating parameter (e.g. an optimal switching frequency) as a function of a load for use in generating at least a portion of the table shown in FIG. 3 in accordance with an embodiment of the present invention.

An example set of such optimal parameter values vs. load is represented in a graph 157 in FIG. 4. The parameter for this example is the switching frequency. As the load is increased, the optimal switching frequency increases or decreases in discrete steps. The load values where the steps occur may be used to determine a beginning and end for a load range for each predetermined state to be defined in the state lookup table 113 or 130. The frequency value of the graph 157 within each step may be used to generate the switching frequency portion of the parameter lookup table 114, 131 or 145.

An allowable or acceptable size for each of the steps (e.g. 5 KHz, 20 KHz, 25 KHz, 100 KHz, etc.) in the optimal switching frequency value may determine the granularity or number of states. A smaller step size, for instance, may result in a higher granularity or larger number of states, and a larger step size may result in a lower granularity or smaller number of states.

A smaller step size and a larger number of states may result in the overall efficiency in the electronic device 100 being closer to optimal. However, a relatively large number of states may require more processing power by the controller 108 or 123 to monitor the state and set the adjustable parameters, which may adversely affect performance, power usage and overall efficiency of the electronic device 100. Additionally, a relatively large number of states may result in changing the adjustable parameters during operation of the electronic device 100 so often as to negatively impact efficiency. Some tradeoffs or compromises may thus have to be made between the total number of states and the overall efficiency of the electronic device 100.

As a result of the iterative testing or simulations, other graphs of optimal parameter value vs. load may be drawn for the other adjustable parameters, but for simplicity, are not shown here. The optimal parameter value data thus represented in each such graph may show similar steps as are shown in the graph 157. However, such steps in the data may or may not occur at the same load values for each adjustable parameter. Consequently, to account for all of the steps in the data for all of the adjustable parameters may require the delineation of a relatively large number of states, which may be undesirable as discussed above. To use fewer states, however, some compromises may be made with regard to the optimal point at which the parameter values change as indicated by the iterative testing or simulations.

To determine the optimal parameter value for each adjustable parameter, the iterative testing or simulation results in a data set that relates the parameter value to efficiency for multiple load values (and operating modes or other conditions). Graphs 158-169 of FIGS. 5-8, for example, represent such a data set for the voltage level parameter on the Vbus 112 (FIG. 1). These graphs 158-169 were generated by circuitry simulations using a generally representative notebook computer system circuit with a variety of voltage regulators and example loads.

The graphs 159, 162, 165 and 168 relate the voltage level on the Vbus 112 to the combined efficiency of the POL voltage regulators 102-104. The graphs 158, 161, 164 and 167 relate the voltage level on the Vbus 112 to the efficiency of the power bus voltage regulator 101. The graphs 160, 163, 166 and 169 relate the voltage level on the Vbus 112 to the cascaded combined efficiency of the POL voltage regulators 102-104 and the power bus voltage regulator 101.

Figure 5:
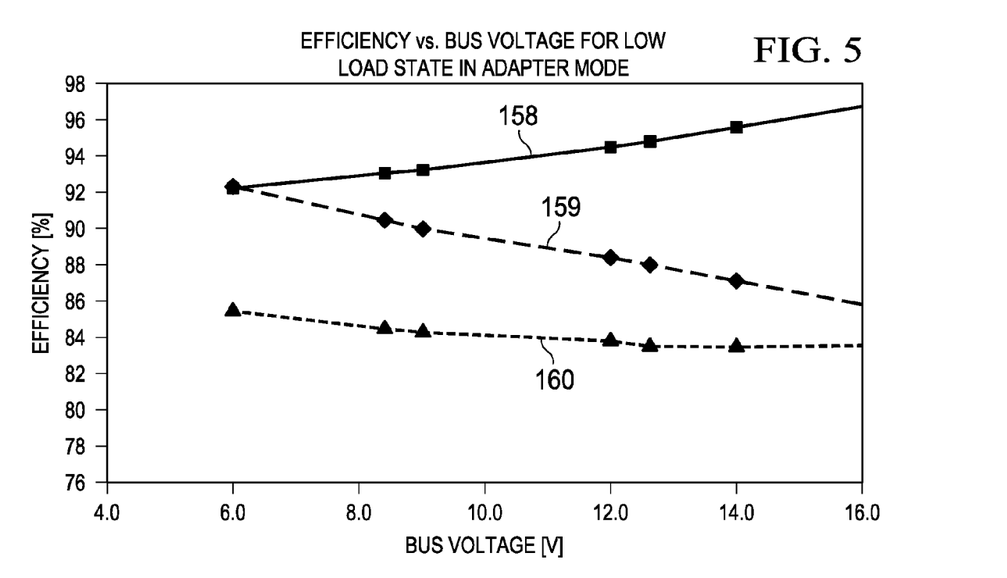
FIGS. 5-8 are examples of graphs of efficiency as a function of an adjustable operating parameter (e.g. a power bus voltage level) for use in generating at least a portion of the table shown in FIG. 3 in accordance with an embodiment of the present invention.
Figure 6:
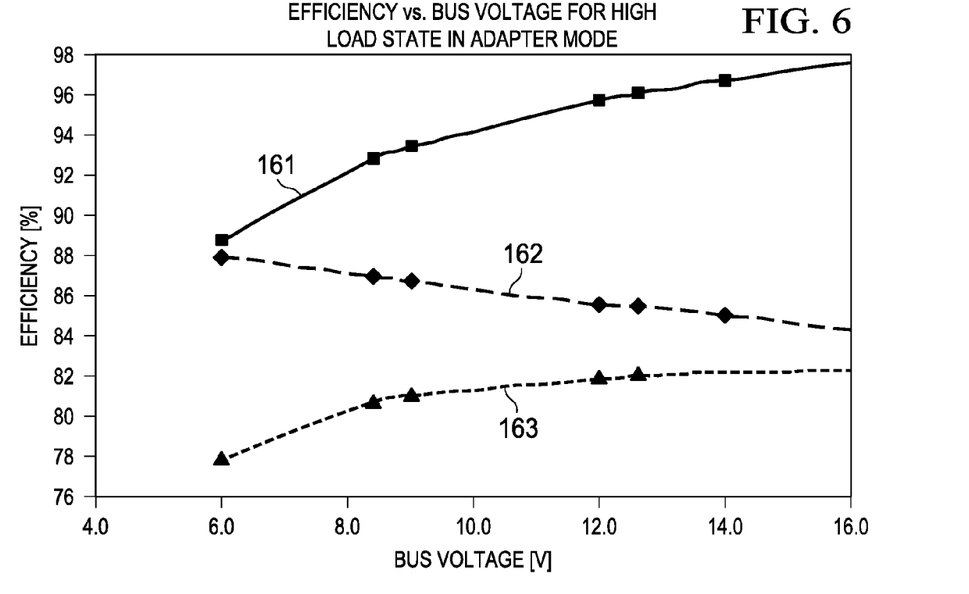

The graphs 158-163 of FIGS. 5 and 6 illustrate these efficiencies for a situation in which the electronic device 100 is powered by the DC source of FIG. 1 with an adapter (i.e. in adapter mode). The graphs 164-169 of FIGS. 7 and 8 illustrate these efficiencies for a situation in which the electronic device 100 is powered by the battery 110 (i.e. in battery mode).

Figure 7:
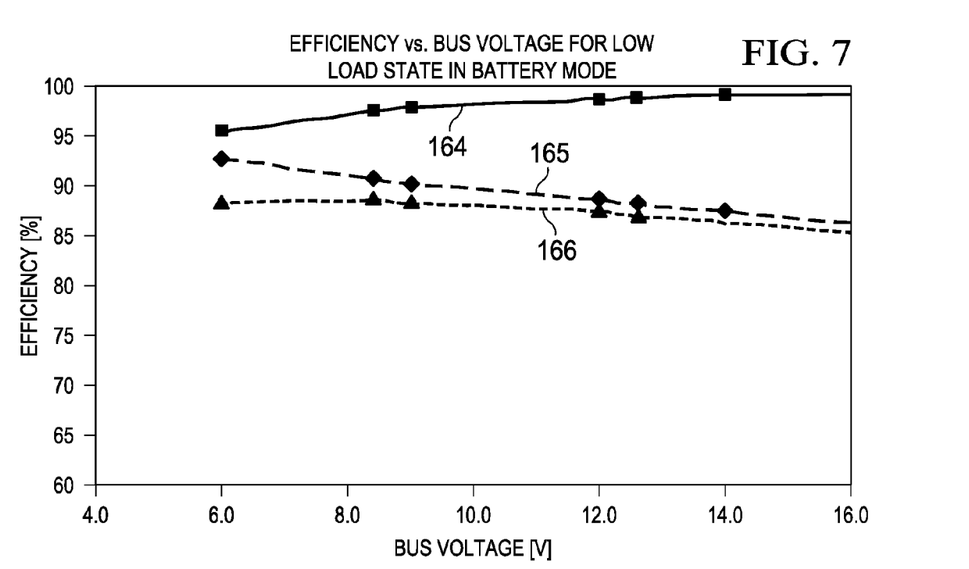

The graphs 158-160 and 164-166 of FIGS. 5 and 7 illustrate these efficiencies under a relatively low load operating condition or state. Under these conditions the POL voltage regulators efficiency graphs 159 and 165 show a higher efficiency at a relatively low voltage level for the Vbus 112. However, the opposite is shown for the power bus voltage regulator efficiency graphs 158 and 164, which leads to the cascaded combined efficiency graphs 160 and 166 showing that the highest overall efficiency is at a relatively low voltage level for the Vbus 112.

Figure 8:
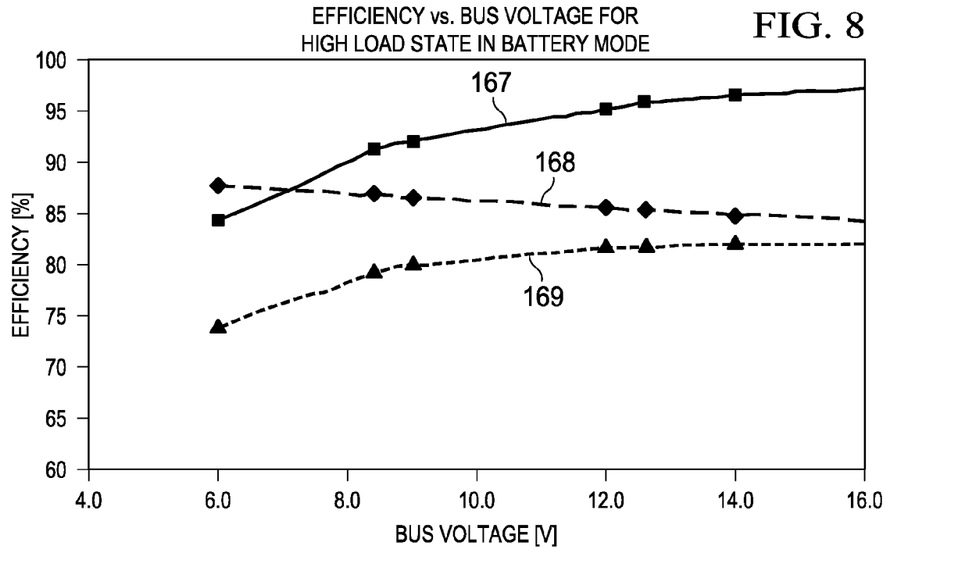

On the other hand, the graphs 161-163 and 167-169 of FIGS. 6 and 8 illustrate these efficiencies under a relatively high load operating condition or state. Under these conditions the POL voltage regulators efficiency graphs 162 and 168 again show a higher efficiency at a relatively low voltage level for the Vbus 112, and again the opposite is shown for the power bus voltage regulator efficiency graphs 161 and 167. However, the cascaded combined efficiency graphs 163 and 169 show that the greatest overall efficiency is at a relatively high voltage level for the Vbus 112.

Other graphs for efficiency vs. the voltage level on the Vbus 112 could be drawn for other load conditions or states, but are not shown here for simplicity. From all of the data thus represented by such graphs, optimal values for the voltage level on the Vbus 112 may be determined for a complete set of load conditions or states for the electronic device 100, which may be used to produce the Vbus parameter portion of the parameter lookup table 114, 131 or 145.

Additionally, a similar set of graphs may be made for data for the other adjustable parameters, but are not shown here for simplicity. From all of the data thus represented by such graphs, optimal values for the other adjustable parameters may be determined for a complete set of load conditions or states for the electronic device 100, which may be used to produce the other portions of the parameter lookup table 114, 131 or 145.

Figure 9:
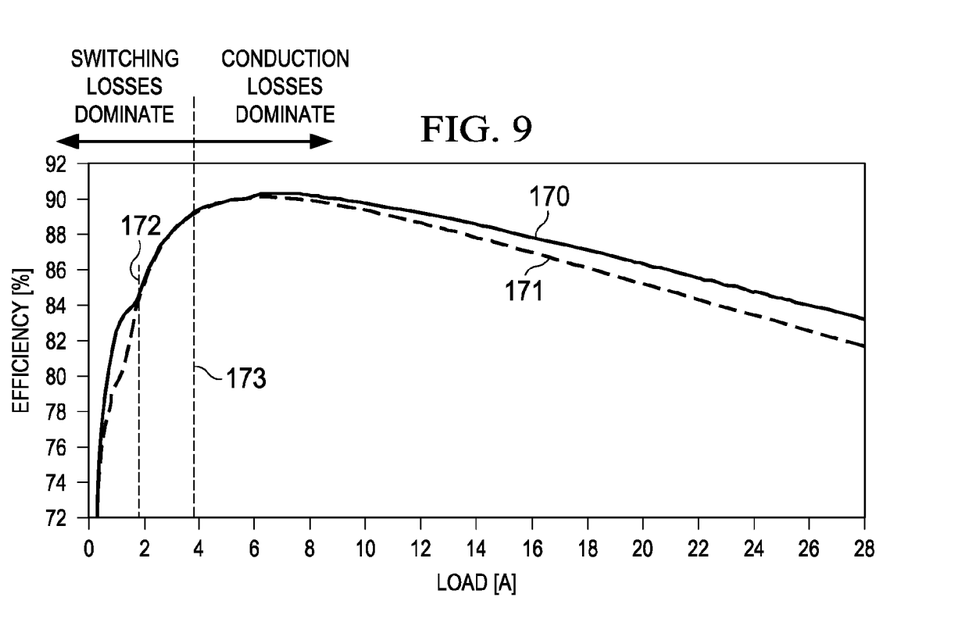
FIG. 9 is an example graph of efficiency vs. load for at least a portion of an electronic device incorporating an embodiment of the present invention (e.g.

FIG. 9 shows an example efficiency vs. load graph 170 (solid line) generated from a simulation of an example circuit based on the electronic device 100 shown in FIG. 1 incorporating an embodiment of the present invention. The example efficiency vs. load graph 170 is shown alongside an example prior art efficiency vs. load graph 171 (dashed line). In other words, the graph 170 results from a simulation in which the parameters (as discussed herein) of the voltage regulators of the example circuit are adjusted as the load is varied during the simulation, and the prior art graph 171 results from a simulation of the same circuit in which the parameters are not adjusted during simulated operation thereof.

A dashed line 172 indicates a load level at which a continuous conduction mode (CCM) boundary is crossed. A slight discontinuity can be seen in the graphs 170 and 171 in the vicinity of this point.

Another dashed line 173 indicates a load level below which switching losses dominate and above which conduction losses dominate. Near the dashed line 173 the graphs 170 and 171 show a relatively close match between the efficiency level in the two simulations. Further from the dashed line 173, however, the graphs 170 and 171 diverge such that the graph 170 generated by an embodiment of the present invention shows a higher efficiency level than does the prior art graph 171.

Figure 10:
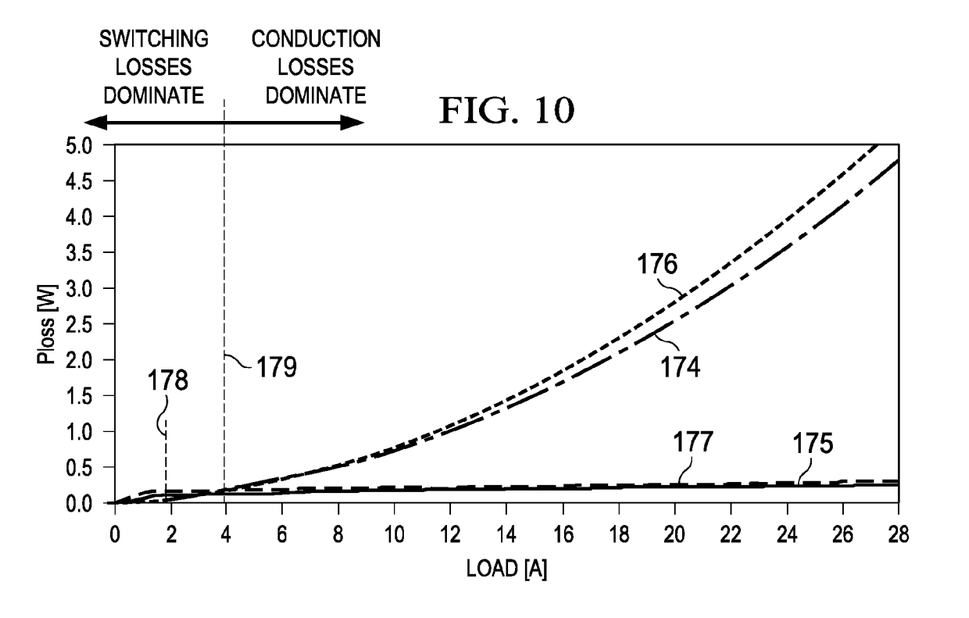
FIG. 10 is an example graph of power loss due to conduction losses and an example graph of power loss due to switching losses for at least a portion of an electronic device incorporating an embodiment of the present invention (e.g.

FIG. 10 shows example power loss (Ploss) vs. load graphs 174 and 175 (solid lines) due to conduction losses and switching losses, respectively. These graphs 174 and 175 are generated from a simulation of an example circuit based on the electronic device 100 shown in FIG. 1 incorporating an embodiment of the present invention. The example Ploss vs. load graphs 174 and 175 are shown alongside example prior art Ploss vs. load graphs 176 and 177 (dashed lines) due to conduction losses and switching losses, respectively. In other words, the graphs 174 and 175 result from a simulation in which the parameters (as discussed herein) of the voltage regulators of the example circuit are adjusted as the load is varied during the simulation, and the prior art graphs 176 and 177 result from a simulation of the same circuit in which the parameters are not adjusted during simulated operation thereof.

As in FIG. 9, a dashed line 178 indicates the load level at which the CCM boundary is crossed. A slight discontinuity can be seen in the graphs 174-177 in the vicinity of this point.

Additionally, another dashed line 179 indicates the load level below which switching losses dominate and above which conduction losses dominate. Near the dashed line 179 the conduction loss graphs 174 and 176 show a relatively close match between the efficiency level in the two simulations. Further from the dashed line 179, however, the conduction loss graphs 174 and 176 diverge such that the graph 174 generated by an embodiment of the present invention shows a lower power loss level than does the prior art graph 176. Additionally, a comparison of the switching loss graphs 175 and 177 generally reveals that the graph 175 generated by an embodiment of the present invention shows a lower power loss level than does the prior art graph 177 almost throughout its entire length.

Figure 11:
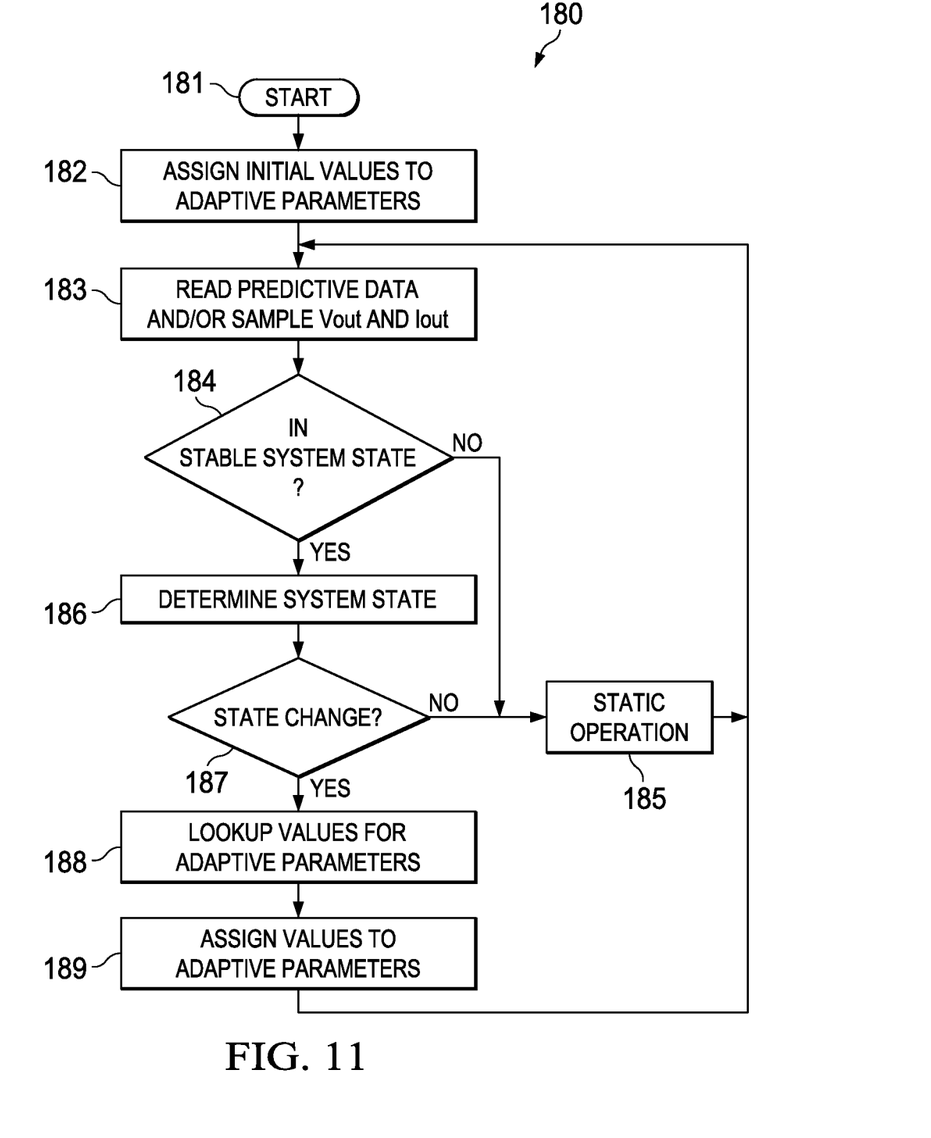
FIG. 11 is a simplified flow chart for an example process for controlling the dynamically optimizable system power architecture shown in FIG. 1 in accordance with an embodiment of the present invention.

FIG. 11 shows a simplified flow chart for an example process 180 for controlling (e.g. by the controller 108 or 123, and possibly in conjunction with other components) at least a portion of the dynamically optimizable system power architecture of the electronic device 100 in accordance with an embodiment of the present invention. It is understood that the process 180 is shown for illustrative purposes only. Thus, other processes or individual sub-functions or order of sub-functions may be used to achieve the same or similar overall function to set/reset the adjustable parameters of one or more of the voltage regulators 101-104 and optimize the efficiency of the electronic device 100 or at least a portion thereof.

Upon starting (at 181), presumably at startup of the overall electronic device 100, initial values are assigned (at 182) to the adaptive parameters. The initial parameter values may be based on known startup conditions for the voltage regulators 101-104. Alternatively, initial parameter values may be hardwired into the voltage regulators 101-104 to enable startup, since the controller 108 or 123 may not be operating yet at this point. Additionally, the remainder of the process 180 may be delayed to allow the electronic device 100 or one or more of the voltage regulators 101-104 to finish its startup procedure before the adjustable parameters are dynamically adjusted.

The predictive data is then read at 183. Alternatively or in addition to reading the predictive data, the output voltage Vout and output current Iout (i.e. current load data) of the voltage regulators 101-104 are sampled at 183. If the predictive and/or current load data indicate that the electronic device 100 or the load 105-106 or any of the voltage regulators 101-104 is not stable or in a steady state condition, as determined at 184, then it may not be possible to determine appropriate values to which to set the adjustable parameters. Additionally, it may be simply undesirable to change the adjustable parameters under such operating conditions. Therefore, no change is made to the adjustable parameters in this case, i.e. static operation is maintained (e.g. at 185).

The predictive and/or current load data may have to be read or sampled (e.g. in a loop of 183-185) several times before the electronic device 100 or at least one of the loads 105-107 of the voltage regulators 101-104 is in a stable system state, as determined at 184. Once such stability occurs, however, the state of the system or a portion thereof is determined (at 186) from the predictive and/or current load data, e.g. by using the state lookup table 113 or 130 (FIGS. 1 and 2). If the state has not changed from a previous state determination (as ascertained at 187), then there is no need to go through the part of the process 180 that resets the adjustable parameters. Therefore, static operation may be maintained (e.g. at 185) and the process 180 repeated from 183 to 187 until a change in state is detected at 187.

When a change in state (for the electronic device 100 or a portion thereof) is detected at 187, the corresponding values for the adaptive or adjustable parameters are looked up (at 188) in the parameter lookup table 114, 131 or 145 (FIGS. 1-3). These values are then assigned (at 189) to the adaptive/adjustable parameters of the affected voltage regulators 101-104 as described above with respect to FIGS. 1 and 2. The process 180 then returns to 183 to repeat as long as the electronic device 100 is operational.

As an alternative, if the predictive data (if used) received at 183 indicates when the system (or portion thereof) will stabilize and/or the state at which it will stabilize, then the controller 108 or 123 can prepare in advance instead of simply waiting in the loop at 183-185. In this case, the process 180 may proceed to look up the imminent state (similar to 186), determine whether the imminent state will be a change of state (similar to 187) and look up values for the adjustable parameters (similar to 188) in anticipation of setting the parameter values (as at 189) as soon as (or optionally before) the state stabilizes. Other alternatives will be apparent from the full description herein.

Presently preferred embodiments of the present invention and its improvements have been described with a degree of particularity. This description has been made by way of preferred example. It should be understood, however, that the scope of the claimed subject matter is defined by the following claims, and should not be unnecessarily limited by the detailed description of the preferred embodiments set forth above.

The invention claimed is:

1. An electronic device comprising:
a load within at least a portion of the electronic device;
a voltage regulator powering the load and having operating parameters that can be set during operation; and
a controller connected to the voltage regulator, the controller repeatedly determining a state of at least the portion of the electronic device and repeatedly setting the operating parameters of the voltage regulator in response to determining the state to optimize system power usage in at least the portion of the electronic device during operation of the voltage regulator, the state being selectable from at least three predetermined states, values for the operating parameters being selectable from a plurality of sets of values, each set of values corresponding to at least one of the predetermined states.

2. The electronic device of claim 1, further comprising:
a plurality of the load within at least the portion of the electronic device; and
a plurality of the voltage regulator powering the loads and each having the operating parameters that can be set during operation;
and wherein:
the controller is connected to the voltage regulators; and
the controller repeatedly sets the operating parameters of the voltage regulators in response to determining the state to optimize system power usage in at least the portion of the electronic device during operation of the voltage regulator.

3. The electronic device of claim 2, wherein:
the operating parameters for each of the voltage regulators include a switching frequency and two gate drive voltages; and
the operating parameters for at least one of the voltage regulators further include an output voltage level.

4. The electronic device of claim 2, wherein:
the operating parameters of each voltage regulator is set independently of the other voltage regulators.

5. The electronic device of claim 2, wherein:
one of the voltage regulators provides power to the other voltage regulators at a voltage level;
the voltage level is one of the operating parameters of the one voltage regulator; and
the voltage level provided by the one voltage regulator is set in response to determining the state.

6. The electronic device of claim 1, wherein:
the controller determines the state of at least the portion of the electronic device based on the load.

7. The electronic device of claim 1, wherein:
the controller determines the state of at least the portion of the electronic device based on predictive data.

8. The electronic device of claim 1, wherein:
the controller determines the state of at least the portion of the electronic device based on predictive data and the load.

9. The electronic device of claim 1, wherein:
the operating parameters include a switching frequency and two gate drive voltages.

10. An electronic device comprising:
a means for regulating a voltage, the voltage being for powering a load within at least a portion of the electronic device, the regulating means having a plurality of adjustable operating parameters including a switching frequency and two gate drive voltages;
a means for receiving feedback related to the load;
a means for receiving predictive data related to a state of at least the portion of the electronic device;
a means for storing state definitions for at least three predetermined states in which at least the portion of the electronic device can operate;
a means for storing operating parameter data including a plurality of sets of values for the adjustable operating parameters, each set corresponding to at least one of the predetermined states;
a means for determining the state of at least the portion of the electronic device by looking up the state in the state definitions storing means using the received feedback related to the load and the received predictive data;
a means for selecting the adjustable operating parameters by looking up the set of the adjustable operating parameters that corresponds to the determined state; and
a means for setting the selected adjustable operating parameters in the regulating means during operation thereof.

11. The electronic device of claim 10, further comprising:
a plurality of the means for regulating a plurality of voltages, the voltages being for powering a plurality of loads within at least the portion of the electronic device, each regulating means having the plurality of adjustable operating parameters including the switching frequency and the two gate drive voltages, one of the regulating means providing power to the other regulating means at a voltage level, the voltage level being one of the plurality of adjustable operating parameters of the one of the regulating means, the adjustable operating parameters of each regulating means being set independently of the other regulating means.

12. A method comprising:
operating a voltage regulator to power a load within at least a portion of an electronic device, the voltage regulator having a plurality of adjustable operating parameters;
determining a state of at least the portion of the electronic device, the determined state being one of at least three predefined states; and
depending on the determined state, setting the adjustable operating parameters to predetermined values to optimize system power usage in at least the portion of the electronic device during the operating of the voltage regulator, the predetermined values being selectable from a plurality of sets of values, each set of values corresponding to at least one of the predefined states.

13. The method of claim 12, further comprising:
operating a plurality of the voltage regulator to power a plurality of the load within at least the portion of the electronic device, each of the voltage regulators having the plurality of adjustable operating parameters; and
depending on the determined state, setting the adjustable operating parameters of the plurality of the voltage regulators to optimize system power usage in at least the portion of the electronic device during the operating of the plurality of the voltage regulators.

14. The method of claim 13, wherein:
the adjustable operating parameters for each of the voltage regulators include a switching frequency and two gate drive voltages; and
the adjustable operating parameters for at least one of the voltage regulators further include an output voltage level.

15. The method of claim 13, further comprising:
setting the operating parameters of each voltage regulator independently of the other voltage regulators.

16. The method of claim 13, further comprising:
operating one of the voltage regulators to provide power to the other voltage regulators at a voltage level, the voltage level being one of the plurality of adjustable operating parameters of the one voltage regulator; and
depending on the determined state, setting the voltage level provided by the one voltage regulator.

17. The method of claim 12, further comprising:
determining the state of at least the portion of the electronic device based on the load.

18. The method of claim 12, further comprising:
determining the state of at least the portion of the electronic device based on predictive data.

19. The method of claim 12, further comprising:
determining the state of at least the portion of the electronic device based on predictive data and the load.

20. The method of claim 12, wherein:
the adjustable operating parameters include a switching frequency and two gate drive voltages.

* * * * *